K. HODGE.
METHOD OF MAKING STEERING WHEELS.
APPLICATION FILED AUG. 29, 1913. RENEWED AUG. 15, 1918.
1,296,958.
Patented Mar. 11, 1919.
2 SHEETS—SHEET 2.
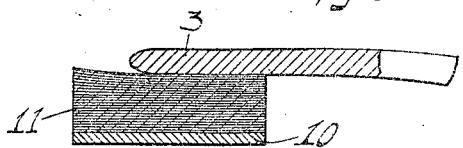
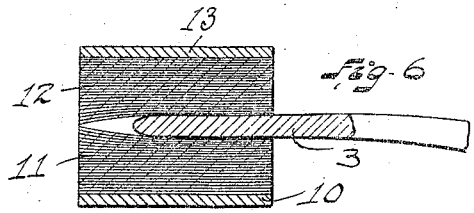
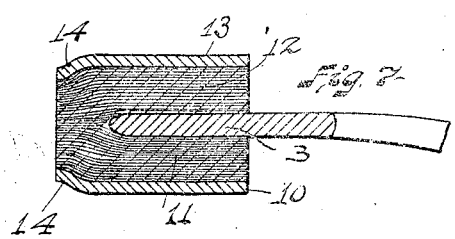
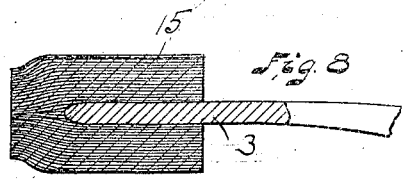
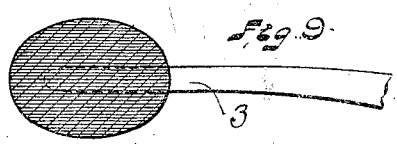
Witnesses
Oliver M. Kappler
H B Fay
Inventor
Karl Hodge
By Fay & Oberlin
Attorneys

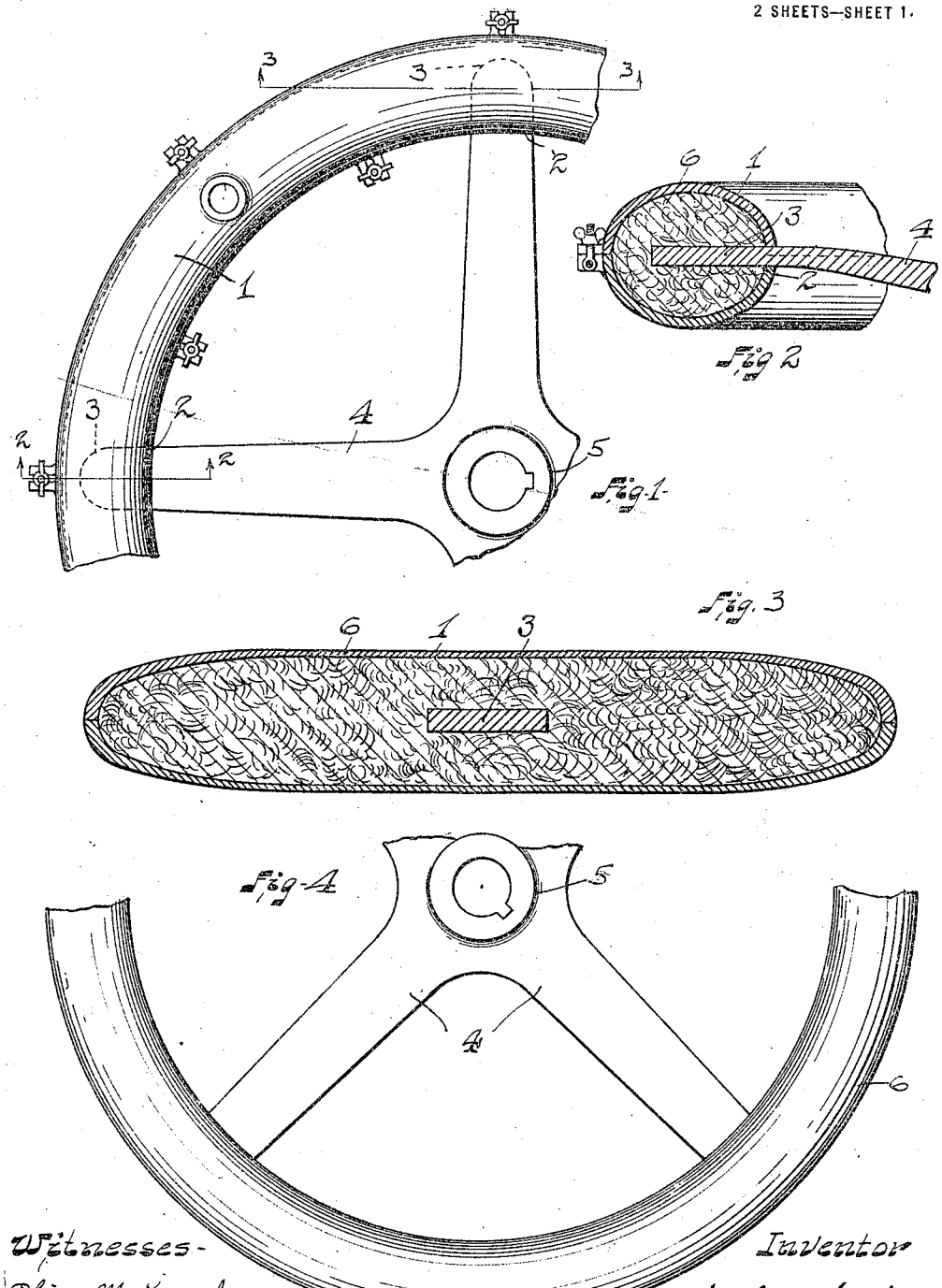

UNITED STATES PATENT OFFICE.

KARL HODGE, OF SIDNEY, OHIO.

METHOD OF MAKING STEERING-WHEELS.

1,296,958.   Specification of Letters Patent.   Patented Mar. 11, 1919.

Application filed August 29, 1913, Serial No. 787,258. Renewed August 15, 1918. Serial No. 250,078.

*To all whom it may concern:*

Be it known that I, KARL HODGE, a citizen of the United States, and a resident of Sidney, county of Shelby, and State of Ohio, have invented a new and useful Improvement in Methods of Making Steering-Wheels, of which the following is a specification, the principle of the invention being herein explained and the best mode in which I have contemplated applying that principle, so as to distinguish it from other inventions.

The majority of the steering wheels which are now used for motor vehicles are made of wood, there being a plain wooden rim to which is attached a spider, the spider consisting of a hub provided with radially extending arms, the ends of which are suitably connected to the annular wooden rim. It is extremely difficult to provide a permanent and secure connection between the ends of the arms and this rim and it is the object of the present invention to provide a method of forming a steering wheel which will positively and permanently attach the spider arms to a suitable rim. This greatly desired result is secured by molding an annular rim of fibrous material about the ends of the spider arms. In this way it is impossible for the arms to ever become detached from the rim unless the rim is first broken, and the strength of wood pulp or fiber is so great that it will be seen that this latter possibility is extremely slight. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a plan view showing a portion of a mold adapted to receive through suitable recesses the ends of the spider arms; Fig. 2 is a section on the line 2—2 in Fig. 1; Fig. 3 is a section on the line 3—3 in Fig. 1; Fig. 4 is a plan view of the finished wheel; Fig. 5 is a transverse section illustrating a modified method of molding the fibrous material to the spider arms; Fig. 6 is a view similar to Fig. 5, but showing this method after the completion of a further step; Fig. 7 is a view similar to Fig. 6 but illustrating a slightly modified form of mold; Fig. 8 is a section through a wheel formed by the process illustrated in Figs. 5 to 7 when removed from the mold; and Fig. 9 is a view similar to Fig. 8, but showing the rim when trimmed to size.

In Fig. 1 I show a portion 1 of the mold which is provided with a plurality of recesses or openings 2, the mold being preferably circular and the recesses being of course on the inner side of the same. In these recesses there may be received the ends 3 of the spider arms 4 which are attached to a central hub 5. When the arms 4 have thus been inserted in the recesses the mold is filled with a suitable type of fibrous material 6, preferably wood pulp, which is under considerable pressure and is in a plastic condition. This material fills the mold completely, the ends of the spider arms being embedded in this material. The material is then hardened by allowing it to dry or by application of heat and pressure and when so hardened is removed from the mold, the steering wheel then being completed, as the spider arms are permanently and positively embedded in the fibrous material which forms the annular rim. No further operations are then necessary except occasionally a smoothing up of the outer surface of the annular rim. Neither have I shown the means for forcing the fibrous material into the mold nor do I show the connections for this purpose as they are relatively unimportant and may take various forms.

Neither have I illustrated in detail the precise construction of the mold, as this is of course a matter of little importance and will readily suggest itself to experts in this art. The general shape of the mold and the relative position of the spider arms in the same are clearly shown, however, in Figs. 2 and 3.

There are various methods of molding fibrous material to the spider arms, and in Figs. 5 to 9 I have illustrated a modified method. In this method there is first provided a flat mold 10 upon which fibrous material in thin strips 11 is placed until a certain thickness of material is formed upon the plate or mold. It will be understood of course that the material as applied to the flat mold is in extremely thin strips and is in a plastic condition. After a certain depth of material has been secured the ends 3 of the spider arms are placed upon this wood pulp and more wood pulp or fibrous material is then added in thin strips 12 until a suitable depth above the spider arms is secured when a second flat plate or mold 13 is placed upon the material and the upper and lower molds are pressed toward each other with a considerable pressure. This operation is shown in Fig. 6, and it will be understood that after the fibrous material has been compressed for a given period, the same is hardened after being first removed from the mold, it being then in the form shown in Fig. 8.

The thin strips 11 and 12 of fibrous material will come together at the outer ends of the spider arms as shown in Figs. 6 and 7. If desirable the molds may be constructed to conform to this bending of the fibrous strips. Thus in Fig. 7 the outer sides 14 of the two flat plates are bent toward each other which will produce a molded rim of similar form, as indicated in Fig. 8.

The molded rim 15 (see Fig. 8), after being removed from the molds and hardened, is considerably over size and must then be trimmed down by any suitable means to the shape shown in Fig. 9. The rim formed by this method is as homogeneous as is the rim formed by the first method, the finished rim in each case appearing as shown in Fig. 4.

The advantage of this new method of making the rim will be at once recognized by those who have had to deal with the former types of wooden steering wheels. The engagement of the spider arms in the rim is much more secure than formerly and there is no possibility of the arms becoming detached from the rim. Furthermore, the rim itself is fully as strong, or even stronger than the rims when made of wood, assuming of course that the size in each case is the same.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:

1. The method of forming steering wheels which consists in molding fibrous material to either side of the spider arms, molding other material to the first-applied material, and then hardening such material.

2. The method of forming steering wheels which consists in molding thin strips of fibrous material to either side of the spider arms, molding other strips of fibrous material to the first-applied strips, and then hardening such material.

3. The method of forming steering wheels which consists in molding thin strips of fibrous material to either side of the spider arms, molding other strips of fibrous material to the first-applied strips under pressure, and then hardening such material.

4. The method of forming steering wheels which consists in molding thin strips of wood pulp to either side of the spider arms, molding other strips of wood pulp to the first-applied pulp under pressure, hardening such wood pulp, and then trimming the hardened rim to the desired size and shape.

Signed by me, this 25' day of August, 1913.

KARL HODGE.

Attested by—
H. B. FAY,
A. L. GILL.